(12) United States Patent
Uke et al.

(10) Patent No.: US 7,175,299 B2
(45) Date of Patent: Feb. 13, 2007

(54) MULTI-LENS ZOOM SYSTEM AND METHOD FOR FLASHLIGHTS

(76) Inventors: Alan Uke, 355-14th St., Del Mar, CA (US) 92014; Steven Wright, P.O. Box 12293, La Jolla, CA (US) 92037

( * ) Notice: Subject to any disclaimer, the term of this patent is extended or adjusted under 35 U.S.C. 154(b) by 0 days.

(21) Appl. No.: 11/127,028

(22) Filed: May 10, 2005

(65) Prior Publication Data
US 2006/0256563 A1    Nov. 16, 2006

(51) Int. Cl.
F21L 4/00    (2006.01)
(52) U.S. Cl. .................. 362/187; 362/331; 362/336; 359/800; 359/823
(58) Field of Classification Search ................ 362/187, 362/331, 335, 336, 338; 359/800, 821, 823
See application file for complete search history.

(56) References Cited
U.S. PATENT DOCUMENTS 5,900,987 A    5/1999  Kreitzer
6,515,803 B2   2/2003  Hirose
6,741,404 B2*  5/2004  Ue et al. ..................... 359/811
6,870,689 B2*  3/2005  Yoshida ...................... 359/683

* cited by examiner

Primary Examiner—Laura K. Tso
(74) Attorney, Agent, or Firm—Foley & Lardner, LLP

(57) ABSTRACT

An efficient system and method for zooming the light from a flashlight is disclosed. Multiple refractive lenses are translated in unison to allow zooming of the light while reducing the size and weight of the required lenses. In another aspect, a meniscus lens is used to reduce the amount of light lost from a light-emitting diode (LED). One method includes providing a light source in a housing and translating a lens arrangement substantially along a light path of a light beam generated by the light source. The lens arrangement includes at least two refractive lenses separated by a gap, a size of the gap being maintained during translation of the lens arrangement.

45 Claims, 5 Drawing Sheets

MULTI-LENS ZOOM SYSTEM AND METHOD FOR FLASHLIGHTS

BACKGROUND OF THE INVENTION

The present invention relates generally to the field of optical devices. In particular, the invention relates to flashlights.

Flashlights with a zooming, or focusing, function generally include a lens which can be moved relative to the light bulb. The lens can bend the light differently based on the distance between the lens and the light bulb. The amount of bending of the light by the lens depends greatly on certain properties of the lens, particularly the thickness of the lens. For increased zooming capability, a thicker lens may be required. However, the increased thickness of the lens results in a substantial increase in the weight of the flashlight. Also, thicker lenses typically have steeply curved surfaces, particularly in the perimeter regions, causing the light of different wavelengths to be refracted differently, resulting in a rainbow effect being produced. Thus, it is desirable to provide increased zooming capability while avoiding the above-described shortcomings.

SUMMARY OF THE INVENTION

The disclosed embodiments of the invention provide a systems, methods and devices for use in flashlights to provide improved illumination. In one aspect, the invention provide an efficient arrangement for zooming the light from a flashlight. In this regard, multiple refractive lenses are translated in unison to allow zooming of the light while reducing the size and weight of the required lenses. In another aspect, the invention provides for the use of a meniscus lens to reduce the amount of light lost from a light-emitting diode (LED).

In one aspect, the invention includes a method of controlling a zoom setting of a flashlight. The method includes providing a light source in a housing and translating a lens arrangement substantially along a light path of a light beam generated by the light source. The lens arrangement includes at least two refractive lenses separated by a gap, a size of the gap being maintained during translation of the lens arrangement.

As used herein, "zoom" refers to the focusing of light from a source at a certain distance from the light source. In the context of a flashlight, focusing may include setting the coverage angle of a flashlight between, for example, a sharp, narrow beam and a wide-angle beam.

A "flashlight" is any arrangement or device having a light source and being adapted to generate a beam of light. The flashlight may include other components, such as a power source (e.g., battery).

A "light source" may be a light bulb, light-emitting diode or other element adapted to produce light.

As used herein, "translating" includes any relative movement between two components. The movement may be along a single axis, such as along the light path.

A "lens arrangement" may include a set of lenses adapted to, for example, alter the path of a beam of light through refraction.

As used herein, "light path" refers to the general path of a beam of light from a light source. The light path may include a central axis around which the light beam is centered. The light path may be straight or may be curved or bent by, for example, a refractor or a reflector.

A "light beam" may be a beam generated by a light source along a light path. The size and intensity of the light beam may be altered by, for example, one or more lenses.

As used herein, "refractive lenses" include any lenses adapted to bend light. The amount of bending may depend on, for example, the angle of incidence of the light and the material of the lens.

A "gap" may be measured along the light path between two lenses. The gap may be a distance between the surfaces of the two lenses facing each other, the distance between two corresponding surfaces (e.g., the surface of each lens facing the light source), or the distance between a mounting position of each lens.

In a particular embodiment, the housing includes an inner housing and an outer housing. The translating includes rotation of the outer housing relative to the inner housing, the rotation causing an axial translation of the outer housing relative to the inner housing.

As used herein, "rotation" refers to changes in the relative angular position of two components.

In another particular embodiment, providing a light source in a housing includes positioning a seal between the inner housing and the outer housing to form a water-tight cavity within the housing.

"Water-tight" refers to isolating the cavity from any liquids outside the cavity. For example, the cavity may be isolated from water.

The light source may be secured to the inner housing, and the lens arrangement may be adapted to translate with the outer housing. In a particular embodiment, the lens arrangement is forced against an inside surface of the outer housing by a resilient spring.

The lens arrangement may include at least two lenses each having a refractive index between 1.2 and 1.8. In a particular embodiment, the refractive index is approximately 1.5.

In a particular embodiment, the light source includes a light-emitting diode (LED). The at least two refractive lenses may include a first lens and a second lens, the first lens being closest to the light source, and a surface of the first lens facing the light source being a meniscus surface.

As used herein, a "meniscus" surface of a lens refers to a concave surface.

In one embodiment, at least on of the refractive lenses includes a surface provided with contours. The contours may form concentrically positioned ripples.

As used herein, "contours" refers to a curving feature on a surface. The contours may be regular or irregular curves and may be formed as semicircles or sine waves, for example.

As used herein, "concentrically" or "concentric" refers to having a substantially common center.

As used herein, "ripples" refers to a series of substantially circular features.

In another aspect of the invention, a flashlight zooming arrangement includes a light source positioned within a housing and a lens arrangement positioned along a light path of a light beam generated by the light source. The lens arrangement includes two or more refractive lenses separated by a gap, the lens arrangement being adapted to translate along the light path while maintaining the gap.

In still another aspect, the invention includes a system of controlling a zoom setting of a flashlight. The system includes means for generating a light beam along a light path, the means for generating a light beam being positioned in a housing. The system also includes means for translating a lens arrangement substantially along a light path of a light beam generated by the light source. The lens arrangement includes at least two refractive lenses separated by a gap, a size of the gap being maintained during translation of the lens arrangement.

In another aspect of the invention, a flashlight includes an illumination portion having a light source and a zooming portion having a lens arrangement positioned along a light path of a light beam generated by the light source. The zooming portion is adapted to translate along the light path relative to the illumination portion, and the lens arrangement includes two or more refractive lenses separated by a gap. The lens arrangement is adapted to translate along the light path while maintaining the gap.

Another aspect of the invention includes a method of directing light in a flashlight. The method includes providing an LED light source within a housing, the LED light source being adapted to generate a light beam along a light path. The method also includes positioning one or more lenses along the light path, the one or more lenses including a lens closest to the light source. A surface of the lens closest to the light source facing the light source is a meniscus surface.

In another aspect, the invention includes a system for directing light in a flashlight. The system includes an LED light source positioned within a housing, the LED light source being adapted to generate a light beam along a light path, and one or more lenses along the light path. The one or more lenses includes a lens closest to the light source, and a surface of the lens closest to the light source facing the light source is a meniscus surface.

DETAILED DESCRIPTION OF THE PREFERRED EMBODIMENTS

Figure 1A:
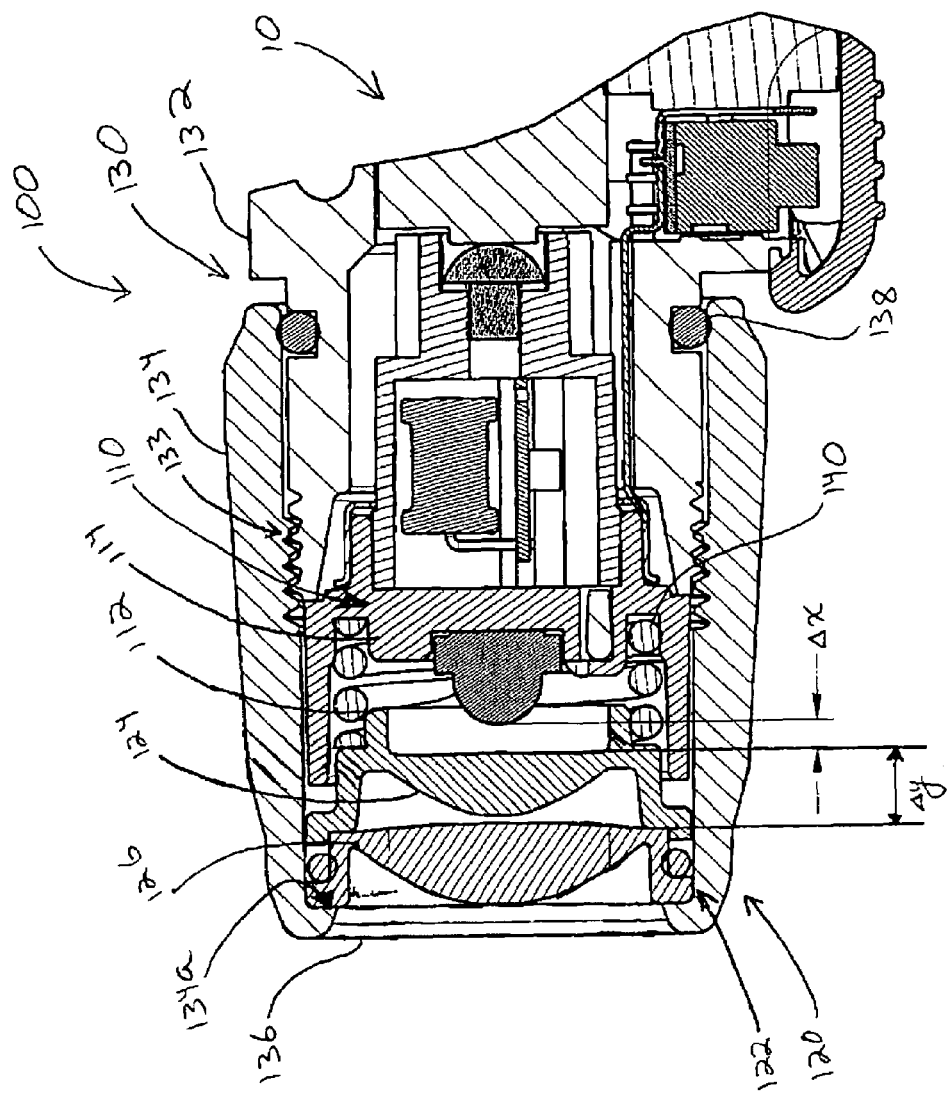
FIG. 1A is cross-sectional view of a portion of an embodiment of a flashlight according to the present invention in a zoom configuration.
Figure 1B:
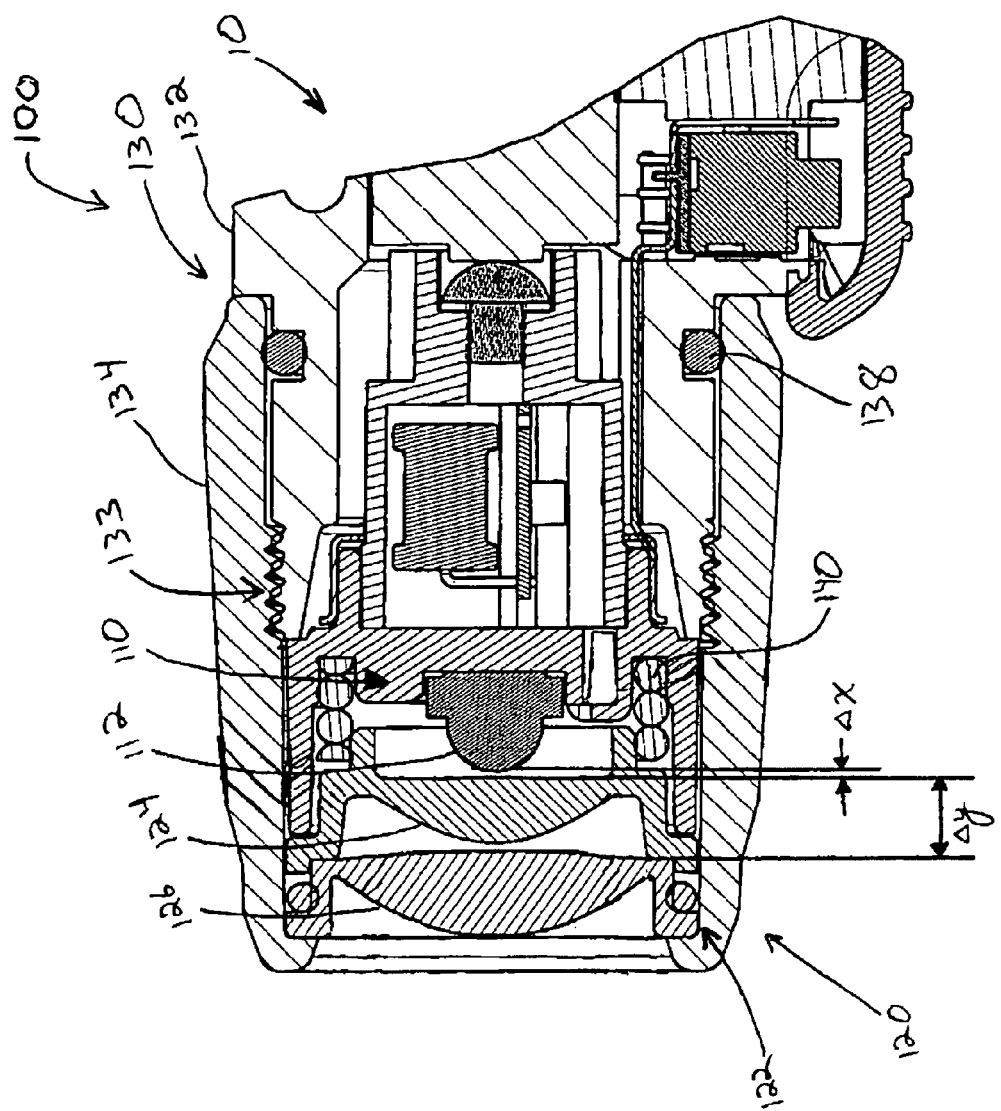
FIG. 1B is a cross-sectional view of the flashlight of FIG. 1A in a wide-angle configuration.

Referring to FIGS. 1A and 1B, a portion of an embodiment of a flashlight 10 is illustrated in a zoomed position (FIG. 1A) and in a wide-angle position (FIG. 1B). The flashlight 10 includes a zooming system 100 adapted to control the zoom setting, or focus, of the light from the flashlight 10. In the context of a flashlight, zooming refers to focusing of light from a light source at a certain distance from the light source. In this regard, the zoom setting may determine whether the light projected by the flashlight 10 is a wide beam, as may be desired when searching or viewing a large area, or a narrow beam, as may be desired when careful examination of a specific region is required.

The zooming system 100 includes an illumination portion 110 and a zooming portion 120. The illumination portion includes a light source 112 to generate a light beam. The light source 112 may be selected from a variety of light sources, such as a light bulb or other element adapted to produce light. In a particular embodiment, the light source 112 includes a light emitting diode (LED). An LED is an efficient source of light that is well known to those skilled in the art.

The LED may generate a substantially amount of heat. In this regard, the illumination portion 110 may be provided with a heat sink 114 to direct the heat away from the LED. In some embodiments, the heat sink 114 may be adapted to direct the heat to the ambient atmosphere or elsewhere outside the illumination portion 110.

The zooming portion 120 includes a lens arrangement 122 adapted to direct the light from the light source 112 out of the flashlight 10 in a desired manner. The lens arrangement 122 is positioned along the light path of the light beam generated by the light source 112. In the embodiment illustrated in FIGS. 1A and 1B, the lens arrangement 122 includes two refractive lenses 124, 126 separated by a gap, $\Delta y$.

The zooming portion 120 is adapted to translate along the light path relative to the illumination portion 110, as indicated by the position of the zooming portion 120 relative to the illumination portion 110 in FIGS. 1A and 1B. The distance between the zooming portion 120 and the illumination portion 110, $\Delta x$, is larger in the zoomed position illustrated in FIG. 1A than in the wide-angle position illustrated in FIG. 1B. The lens arrangement 122 of the zooming portion 120 is adapted to translate along the light path while maintaining the size of the gap, $\Delta y$, as illustrated in FIGS. 1A and 1B.

As noted above, the lens arrangement 122 illustrated in FIGS. 1A and 1B includes two refractive lenses 124, 126. In other embodiments, additional lenses may be provided. By providing multiple lenses adapted to translate in unison (i.e., while maintaining the size of the gap, $\Delta y$), the total weight of the lenses can be reduced when compared to a single lens adapted to provide a similar amount of zooming capability. The lenses 124, 126 are adapted to alter the path of a beam of light through refraction, or bending of the light. The amount of bending may depend on, for example, the angle of incidence of the light and the material of the lens. In this regard, the use of multiple lenses can reduce the steepness of the curvature of the surfaces, providing improved angles of incidence and reducing the associated rainbow effect. In one embodiment, the lens arrangement 122 may include at least lenses 124, 126 having a refractive index between 1.2 and 1.8. In a particular embodiment, the refractive index is approximately 1.5.

The illumination portion 110 and the zooming portion 120 are positioned within a housing 130. In the illustrated embodiment, the housing 130 includes an inner housing 132 and an outer housing 134. A seal 138, such as an O-ring, is positioned between the inner housing 132 and the outer housing 134 to form a water-tight cavity within the housing 130. The seal 138 may be formed of a resilient material, such as a rubber, to maintain the water-tight characteristic of the cavity. Thus, the cavity is isolated from any liquids outside the cavity. For example, the cavity may be isolated from water, allowing the flashlight 10 to be used in an underwater environment.

The light source 112 of the illustrated flashlight 10 is secured to the inner housing 132, while the lens arrangement 122 is adapted to translate with the outer housing 134. The outer housing 134 is provided with a transparent cover 136 to allow the light to pass therethrough. In certain embodiments, the second lens 126 and the transparent cover 136 may be integrated into a single optical element.

The lens arrangement 122 is forced against an inside surface 134a of the outer housing 134 by a resilient spring 140. Thus, as the outer housing 134 is moved relative to the inner housing 132, the lens arrangement 122 correspondingly moves relative to the light source 112.

In the embodiment illustrated in FIGS. 1A and 1B, the translation of the outer housing 134 relative to the inner housing 132 may be accomplished through any of a variety of mechanisms. In the embodiment illustrated in FIGS. 1A and 1B, the translation is enabled through rotation of the outer housing 134 relative to the inner housing 132. The outer housing 134 and the inner housing 132 are provided with complimenting threads 133 which transfer the relative rotation to a relative translation. Thus, the rotation causing an axial translation of the outer housing 134 relative to the inner housing 132.

Figure 2:
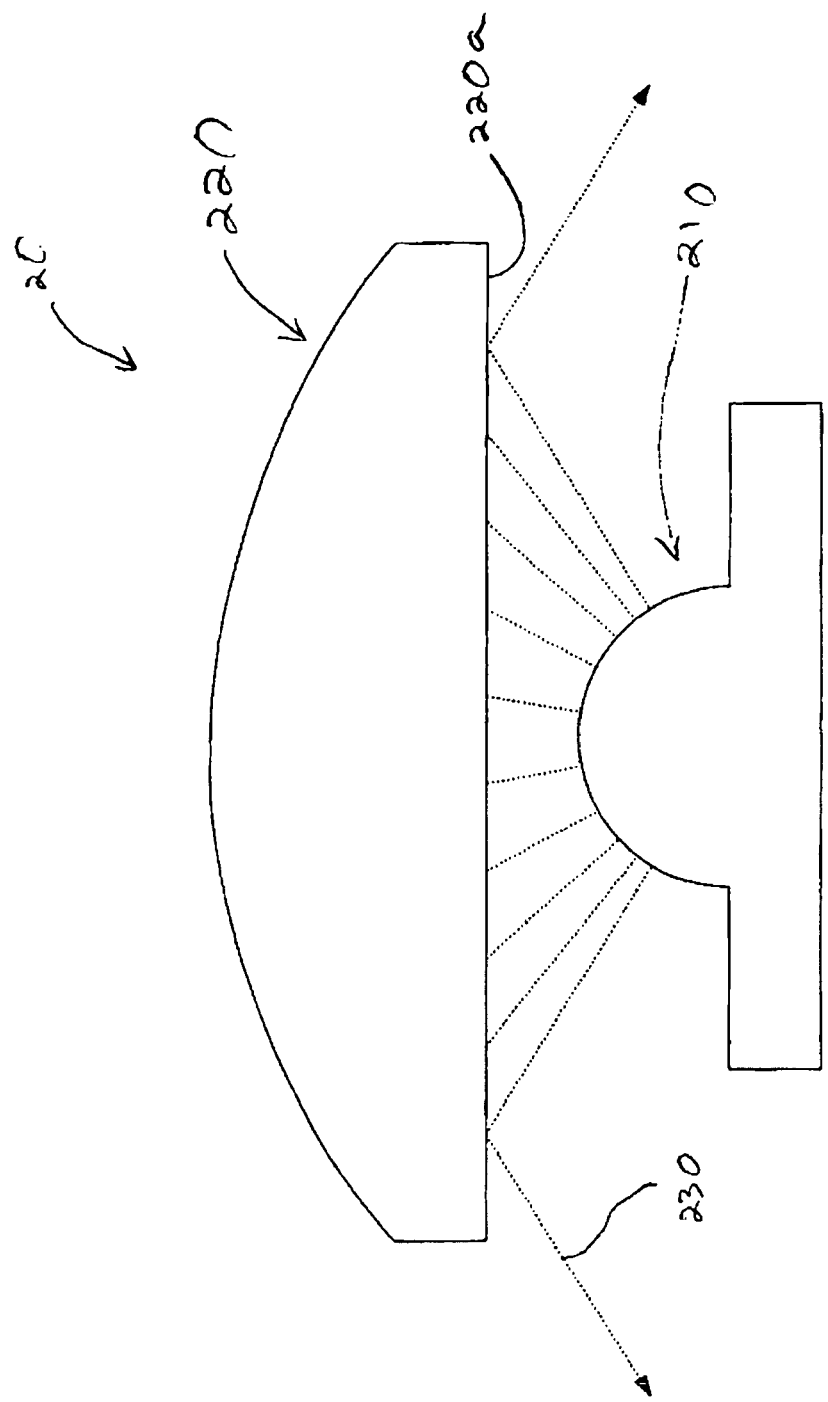
FIG. 2 illustrates a conventional light source and lens combination.

In certain cases, positioning of a lens close to a light source, such as an LED, can result in loss of light intensity due to undesired reflection of the light out of the desired light path. One example of this is illustrated in FIG. 2. The arrangement 20 illustrated in FIG. 2 includes a light source 210 adapted to project light through a lens 220. The light from the light source 210 strikes the lens 220 at different angles of incidence across a surface 220a of the lens 220 closest to the light source 210. On the outer portion of the lens 220, the angle of incidence of the light is sufficiently high, measured from the normal to the surface 220a, to result in internal reflection of at least a portion of the light, as indicated by the light line 230. This reflection represents a loss in the intensity of the light beam projected out of the flashlight. This problem is addressed and solved by an embodiment of the invention illustrated in FIG. 3.

Figure 3:
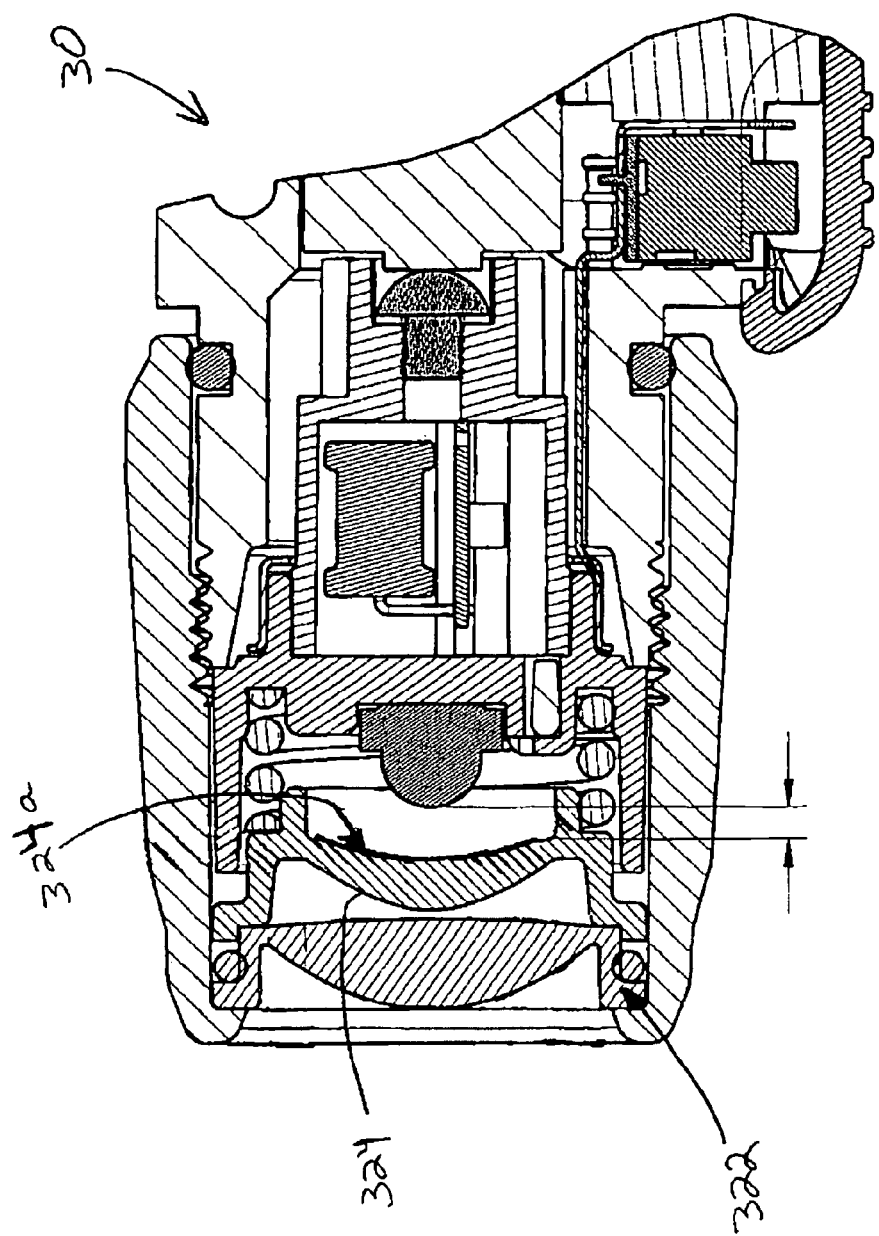
FIG. 3 is cross-sectional view of a portion of another embodiment of a flashlight according to the present invention.

FIG. 3 illustrates an embodiment of a flashlight 30 having a light source, such as an LED, and a lens arrangement 322 for directing the light out of the flashlight 30. The lens arrangement 322 may include one or more lenses. The embodiment illustrated in FIG. 3 includes two lenses, one lens 324 being closest to the light source. A surface 324a of the lens 324 facing the light source is formed as a meniscus surface. In this regard, the surface 324a is formed with a concave configuration. The meniscus configuration of the surface 324a reduces the angle of incidence on the outer portions of the lens 324, thereby reducing or eliminating external reflection. Further, the meniscus configuration allows for the collection of a larger conical angle of the LED output, resulting in increased output light intensity.

Figure 4:
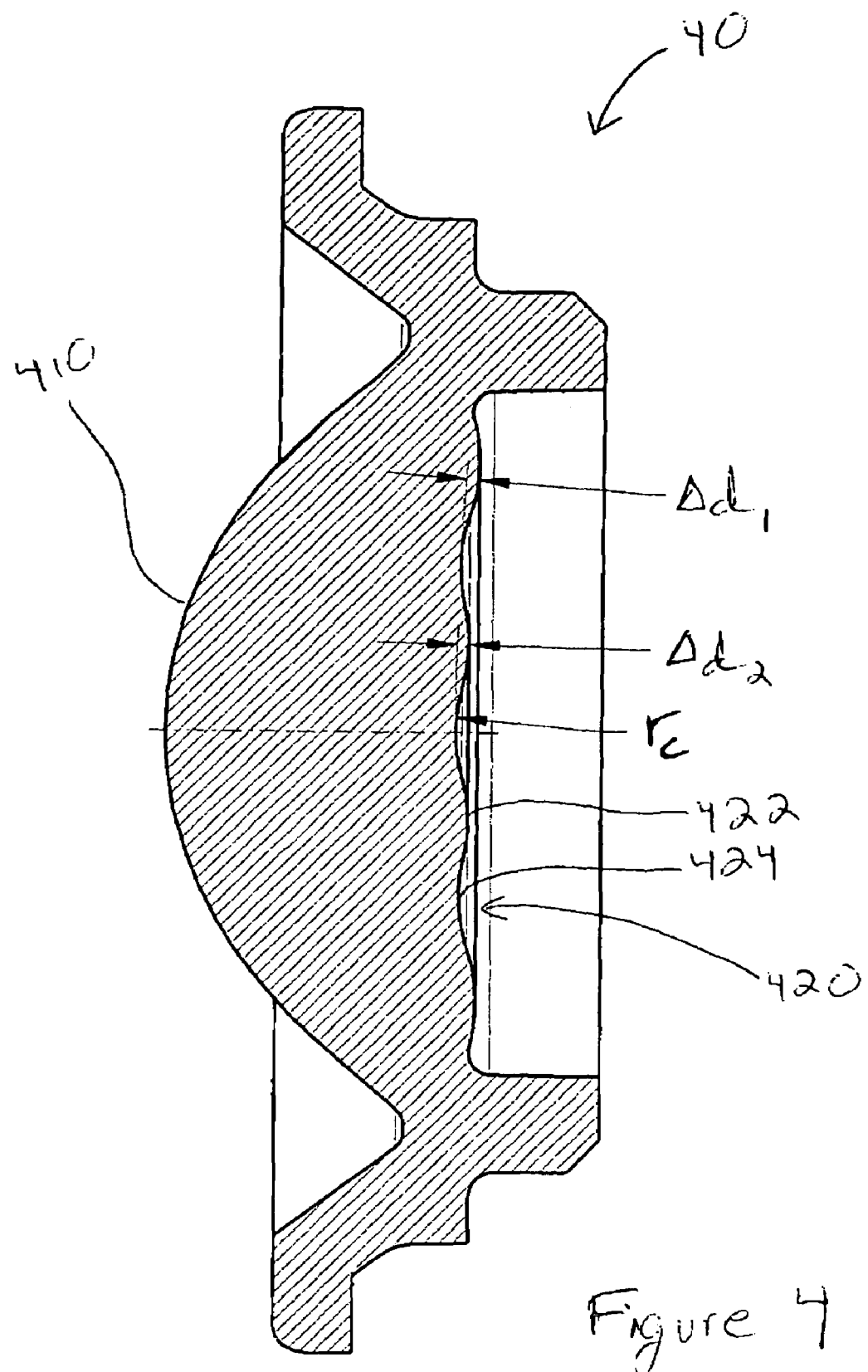
FIG. 4 is a cross-sectional view of a refractive lens for use in a flashlight according to an embodiment of the present invention.

FIG. 4 illustrates an embodiment of a refractive lens 40 which may be used in flashlights, such as the flashlight 10 illustrated in FIGS. 1A and 1B. The refractive lens 40 includes an outer surface 410 away from the light source and an inner surface 420 facing the light source.

The illustrated refractive lens 40 is particularly useful in conjunction with LED light sources. LED's generally generate light whose wavelength varies with angle from the central axis. For example, with reference to FIG. 2, the light striking the central portion of the surface 220a of the lens 220 may have a different wavelength than the light striking the perimeter portion of the surface 220a. In this regard, a lens such as the exemplary refractive lens 40 illustrated in FIG. 4 may be used to integrate the light from the LED to produce a more uniform beam, as well as creating a circular beam from a rectangular LED chip.

The integration of the light from the LED is facilitated by contours formed on a surface of the lens 40. In the illustrated embodiment, the contours are formed on the inner surface 420. In other embodiments, the contours may be formed on the outer surface or on both surfaces. In the illustrated embodiment, the contours are formed as a series of concentric ripples, each ripple being configured as a semicircle or a sine wave. In the case of a semicircle, the ripples may be defined by a radius of curvature, $r_c$. In the case of a sine wave, the ripples may be defined by an amplitude, $\Delta d_1$ or $\Delta d_2$, and the wavelength, measured as the distance between adjacent crests 424 or adjacent troughs 422. In one embodiment, the ripples are arranged as concentric circles on the surface 420 of the lens 40. Further the size and shape of each ripple, as measured by the radius of curvature, $r_c$ or the amplitude and wavelength, may be different or the same. For example, in one embodiment, $\Delta d_1$ and $\Delta d_2$ are the same, while in another embodiment, they may be different.

In another embodiment, the contouring on the inner surface 420 may be superimposed on a meniscus surface, such as the meniscus surface 324a illustrated in FIG. 3. Further, in a lens arrangement having multiple refractive lenses, the contouring may be formed on any of the multiple lenses. For example, in one embodiment, the contouring is formed on the lens closest to the light source.

Thus, when light from an LED strikes the inner surface 420 of the exemplary refractive lens 40, the light striking a ripple in one region is refracted in different directions due to the contouring and mixes with light being refracted from a ripple in another region. Thus, the light beam exiting the refractive lens is made more uniform.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. A method of controlling a zoom setting of a flashlight, comprising:
    providing a light source in a housing; and
    translating a lens arrangement substantially along a light path of a light beam generated by the light source to vary a distance between the light source and the lens arrangement;
    wherein the lens arrangement includes at least two refractive lenses separated by a gap, a size of the gap being maintained during translation of the lens arrangement.

2. The method of claim 1, wherein the housing includes an inner housing and an outer housing, and wherein the translating includes rotation of an outer housing relative to an inner housing, the rotation causing an axial translation of the outer housing relative to the inner housing.

3. The method of claim 2, wherein the providing a light source in a housing includes positioning a seal between the inner housing and the outer housing to form a water-tight cavity within the housing.

4. The method of claim 2, wherein the light source is secured to the inner housing, and wherein the lens arrangement is adapted to translate with the outer housing.

5. The method of claim 4, wherein the lens arrangement is forced against an inside surface of the outer housing by a resilient spring.

6. The method of claim 1, wherein the lens arrangement includes at least two lenses each having a refractive index between 1.2 and 1.8.

7. The method of claim 6, wherein the refractive index is approximately 1.5.

8. The method of claim 1, wherein the light source includes a light-emitting diode (LED).

9. The method of claim 8, wherein the at least two refractive lenses include a first lens and a second lens, the first lens being closest to the light source, and
wherein a surface of the first lens facing the light source is a meniscus surface having a concave configuration.

10. The method of claim 9, wherein a surface of the first lens facing the light source is provided with contours.

11. The method of claim 10, wherein the contours form concentrically positioned ripples.

12. The method of claim 1, wherein the at least two refractive lenses include a first lens and a second lens, the first lens being closest to the light source, and
wherein a surface of the first lens facing the light source is a meniscus surface having a concave configuration.

13. The method of claim 1, wherein at least one of the refractive lenses includes a surface provided with contours.

14. The method of claim 13, wherein the contours form concentrically positioned ripples.

15. A flashlight zooming arrangement, comprising:
a light source positioned within a housing; and
a lens arrangement positioned along a light path of a light beam generated by the light source;
wherein the lens arrangement includes two or more refractive lenses separated by a gap, the lens arrangement being adapted to translate along the light path to vary a distance between the light source and the lens arrangement while maintaining the gap.

16. The arrangement of claim 15, wherein the housing includes an inner housing and an outer housing adapted to rotate relative to each other, thereby causing an axial translation of the outer housing relative to the inner housing.

17. The arrangement of claim 16, wherein the housing includes a seal positioned between the inner housing and the outer housing to form a water-tight cavity within the housing.

18. The arrangement of claim 16, wherein the light source is secured to the inner housing, and wherein the lens arrangement is adapted to translate with the outer housing.

19. The arrangement of claim 18, further comprising a resilient spring adapted to force the lens arrangement against an inside surface of the outer housing.

20. The arrangement of claim 15, wherein the lens arrangement includes at least two lenses each having a refractive index between 1.2 and 1.8.

21. The arrangement of claim 20, wherein the refractive index is approximately 1.5.

22. The arrangement of claim 15, wherein the light source includes a light-emitting diode (LED).

23. The arrangement of claim 22, wherein the at least two refractive lenses include a first lens and a second lens, the first lens being closest to the light source, and
wherein a surface of the first lens facing the light source is a meniscus surface having a concave configuration.

24. The arrangement of claim 23, wherein a surface of the first lens facing the light source is provided with contours.

25. The arrangement of claim 24, wherein the contours form concentrically positioned ripples.

26. The arrangement of claim 15, wherein the at least two refractive lenses include a first lens and a second lens, the first lens being closest to the light source, and
wherein a surface of the first lens facing the light source is a meniscus surface having a concave configuration.

27. The arrangement of claim 15, wherein at least one of the refractive lenses includes a surface provided with contours.

28. The arrangement of claim 27, wherein the contours form concentrically positioned ripples.

29. A system of controlling a zoom setting of a flashlight comprising:
means for generating a light beam along a light path, the means for generating a light beam being positioned in a housing; and
means for translating a lens arrangement substantially along a light path of a light beam generated by the light source to vary a distance between the light source and the lens arrangement;
wherein the lens arrangement includes at least two refractive lenses separated by a gap, a size of the gap being maintained during translation of the lens arrangement.

30. The system of claim 29, wherein the housing includes an inner housing and an outer housing, and wherein the translating includes rotation of an outer housing relative to an inner housing, thereby causing an axial translation of the outer housing relative to the inner housing.

31. The system of claim 30, wherein the housing includes a seal between the inner housing and the outer housing to form a water-tight cavity within the housing.

32. The system of claim 30, wherein the means for generating a light beam is secured to the inner housing, and wherein the lens arrangement is adapted to translate with the outer housing.

33. The system of claim 32, wherein the lens arrangement is forced against an inside surface of the outer housing by a resilient spring.

34. The system of claim 29, wherein the lens arrangement includes at least two lenses each having a refractive index between 1.2 and 1.8.

35. The system of claim 34, wherein the refractive index is approximately 1.5.

36. The system of claim 29, wherein the means for generating a light beam includes a light-emitting diode (LED).

37. The system of claim 36, wherein the at least two refractive lenses include a first lens and a second lens, the first lens being closest to the light source, and
wherein a surface of the first lens facing the light source is a meniscus surface having a concave configuration.

38. The system of claim 29, wherein the at least two refractive lenses include a first lens and a second lens, the first lens being closest to the light source, and
wherein a surface of the first lens facing the light source is a meniscus surface having a concave configuration.

39. A flashlight, comprising:
an illumination portion having a light source; and
a zooming portion having a lens arrangement positioned along a light path of a light beam generated by the light source;
wherein the zooming arrangement is adapted to translate along the light path relative to the illumination portion to vary a distance between the light source and the lens arrangement, and
wherein the lens arrangement includes two or more refractive lenses separated by a gap, the lens arrangement being adapted to translate along the light path while maintaining the gap.

40. A method of directing light in a flashlight, comprising:
providing an LED light source within a housing, the LED light source being adapted to generate a light beam along a light path; and positioning one or more lenses along the light path, the one or more lenses including a lens closest to the light source, wherein a surface of the lens closest to the light source facing the light source is a meniscus surface having a concave configuration.

41. The method of claim 40, wherein the lens closest to the light source is positioned to maintain a gap between the lens and the light source.

42. The method of claim 40, wherein the lens closest to the light source forms a cap substantially surrounding the LED light source.

43. A system for directing light in a flashlight, comprising:

an LED light source positioned within a housing the LED light source being adapted to generate a light beam along a light path; and one or more lenses along the light path, the one or more lenses including a lens closest to the light source, wherein a surface of the lens closest to the light source facing the light source is a meniscus surface having a concave configuration.

44. The system of claim 43, wherein the lens closest to the light source is positioned to maintain a gap between the lens and the light source.

45. The system of claim 43, wherein the lens closest to the light source forms a cap substantially surrounding the LED light source.

* * * * *